United States Patent
White

(10) Patent No.: US 8,733,419 B2
(45) Date of Patent: May 27, 2014

(54) HANDS FREE AIR CHUCK AND METHOD OF USE

(75) Inventor: Michael R. White, Montgomery City, MO (US)

(73) Assignee: Bosch Automotive Service Solutions LLC, Warren, MI (US)

(*) Notice: Subject to any disclaimer, the term of this patent is extended or adjusted under 35 U.S.C. 154(b) by 148 days.

(21) Appl. No.: 13/228,112

(22) Filed: Sep. 8, 2011

(65) Prior Publication Data

US 2012/0060970 A1 Mar. 15, 2012

Related U.S. Application Data

(60) Provisional application No. 61/403,210, filed on Sep. 13, 2010.

(51) Int. Cl.
*B60C 25/00* (2006.01)

(52) U.S. Cl.
USPC .............. 157/1.1; 81/15.2; 81/15.4; 137/223; 137/315.41

(58) Field of Classification Search
USPC ............ 137/15.08, 223, 229, 315.41, 315.42, 137/355.16, 899; 251/174, 176; 141/1, 38; 269/32, 34; 29/221.5; 81/15.2, 15.4; 152/415, 427, 431, DIG. 8, DIG. 13; 157/1.1
See application file for complete search history.

(56) References Cited

U.S. PATENT DOCUMENTS

| | | | | |
|---|---|---|---|---|
| 682,387 A * | 9/1901 | Peet | | 152/415 |
| 1,373,068 A * | 3/1921 | Harper | | 152/419 |
| 1,486,798 A * | 3/1924 | Reed | | 152/415 |
| 4,759,395 A * | 7/1988 | Tsukamoto | | 157/1.1 |
| 4,981,162 A * | 1/1991 | Grenie et al. | | 141/38 |
| 5,097,875 A * | 3/1992 | Grenie et al. | | 141/38 |
| 5,247,982 A * | 9/1993 | Miller | | 157/1.1 |
| 5,570,733 A * | 11/1996 | Desparois et al. | | 157/1.1 |
| 5,878,801 A * | 3/1999 | Ellis | | 157/1.1 |
| 5,901,736 A * | 5/1999 | McCauley et al. | | 137/231 |
| 5,906,227 A * | 5/1999 | Sowry | | 141/38 |
| 6,470,923 B1 * | 10/2002 | Gonzaga | | 141/38 |
| 7,093,632 B1 * | 8/2006 | Falkenborg | | 152/427 |
| 2011/0247760 A1 * | 10/2011 | White | | 157/1.17 |

FOREIGN PATENT DOCUMENTS

| | | |
|---|---|---|
| DE | 2361695 A1 | 6/1975 |
| DE | 2020006015145 U1 | 2/2008 |
| GB | 2280703 A | 2/1995 |

OTHER PUBLICATIONS

European Search Report mailed on Jan. 3, 2012 for European Application No. 2011180684.0.

* cited by examiner

*Primary Examiner* — John K Fristoe, Jr.
*Assistant Examiner* — Craig J Price
(74) *Attorney, Agent, or Firm* — Baker & Hostetler LLP

(57) ABSTRACT

A tool for filling a tire with a gas is provided. The tool includes: an air chuck; a shaft connected to the air chuck; a rim hook connected to the shaft; and a spring located between the shaft and the rim hook. A method of filling a tire is also provided. The method may include: connecting an air chuck to a valve stem; attaching a hook and spring assembly attached to the air chuck to a rim associated with the tire to be filled; and flowing a fluid through, the air chuck and into the valve stem.

10 Claims, 3 Drawing Sheets

HANDS FREE AIR CHUCK AND METHOD OF USE

CROSS-REFERENCE TO RELATED APPLICATIONS

This application claims priority to the provisional U.S. patent application entitled, Hands Free Lock & Load Dual Foot Air Chuck Clip, filed Sep. 13, 2010, having a Ser. No. 61,403,210, now pending, the disclosure of which is hereby incorporated by reference in its entirety.

FIELD OF THE INVENTION

The present invention relates generally to tools used for inflating tires. More particularly, the present invention relates to a hands free air chuck that can be attached to a valve stem and stay connected to the valve stem without a user needing to hold the air chuck and a method of use.

BACKGROUND OF THE INVENTION

Pneumatic tires are required to be filled with air or another gas such as, for example, nitrogen in order to work properly. Generally, pneumatic tires fall into two categories: tubeless and tires having inner tubes. In either event, the tire itself is installed upon a metal rim which is usually aluminum or steel.

An initial amount of air or other gas placed into the tire will allow the bead of the tire to seat onto the rim. Air or another gas is then usually pumped into the tire via a valve stem that is connected to the rim. The valve stem provides a fluid connection with the interior of the tire to the air or other gas source.

Typically, a tool that is used to put gas into the tire is held by hand onto the valve stem. This can be awkward and may require a user to hold on to the valve stem while the tire is being inflated. While this may not only be inconvenient, it may also be difficult when tires such as truck tires are desired to be inflated within a tire cage. Tire cages are used in the event that a tire fails, the user is protected from flying debris of the tire.

Accordingly, it is desirable to provide a method and apparatus that allows a tool used for inflating a tire to be connected to the valve stem and allow the user to let go of the tool while maintaining its connection with the valve stem in order to be remote from the tire as it is being inflated. Further, it may also be desirable to allow the connection between the tool inflating the tire and the valve stem to be such that the tire maybe moved to a variety of orientations such as laying flat or laying on end or any other orientation without causing the valve stem and tool inflating the tire to be disconnected from each other.

SUMMARY OF THE INVENTION

The foregoing needs are met, to a great extent, by embodiments of the present invention wherein in one aspect, an apparatus and method is provided that in some embodiments permits a tool used for inflating a tire to be connected to the valve stem. Once the tool is connected to valve stem, the user no longer is required to hold on to the tool to maintain the connection between the tool and valve stem. Furthermore, the connection between the tool and valve stem is stable enough that the tire maybe moved to various orientations while the connection between the valve stem the tool is maintained.

In accordance with one embodiment of the present invention, a tool for filling a tire with a gas is provided. The tool includes: an air chuck; a shaft connected to the air chuck; a rim hook connected to the shaft; and a spring located between the shaft and the rim hook.

In accordance with another embodiment of the present invention, a method of filling a tire is also provided. The method may include: connecting an air chuck to a valve stem; attaching a hook and spring assembly attached to the air chuck to a rim associated with the tire to be filled; and flowing a fluid through, the air chuck and into the valve stem.

In accordance with yet another embodiment of the present invention, a tool for filling a tire with a gas may be provided. The tool may include: a means for connecting to a valve stem; means for attaching the means for connecting to the valve stem to a wheel rim; and means for tensioning attached to the tool between the means for connecting to the valve stem and the means for attaching.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
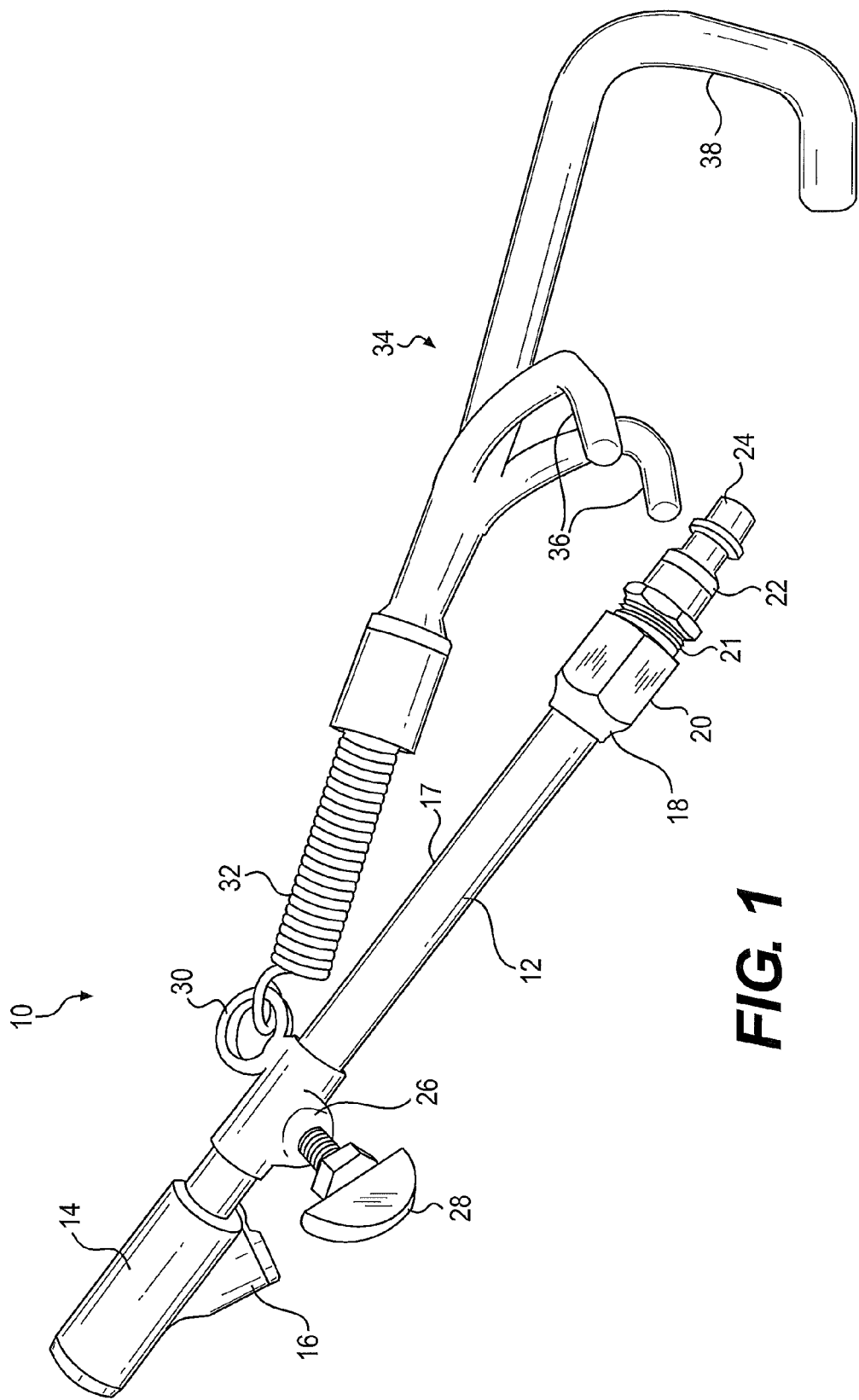
FIG. 1 is a perspective view of a hands free air chuck tool in accordance with an embodiment of the invention.

The invention will now be described with reference to the drawing figures, in which like reference numerals refer to like parts throughout. An embodiment in accordance with the present invention provides a hands free tool that can be used to inflate a tire.

As shown in FIG. 1, the tool 10 in accordance with an embodiment of the invention includes a dual foot 12. A dual foot 12 maybe a standard dual foot 12 readily available in commerce. The dual foot 12 includes an end unit or end fitting 14. The end fitting 14 includes an air chuck 16. The tool 10 also includes an elongated shaft 17 typically part of the dual foot 12. Some embodiments may not use a dual foot 12, but rather use some other type of air chuck 16. The shaft 17 is equipped with a connector 18 which allows the dual foot 12 to be connected to an air source such as an air hose connected to an air compressor. The connector 18 maybe connected to an air hose fitting 22. The connector 18 may have flats 20 which allow the connector 18 to be turned with a tool in order to screw into threads 21 associated with the hose fitting 22. In some embodiments of the invention, the connector 18 has internal threads for this purpose. The hose fitting 22 includes a nipple 24 which fits inside of an air hose not shown.

Tool 10 also includes a locking mechanism 26. The locking mechanism 26 in some embodiments of the invention is configured to slide along the shaft 17 when the locking mechanism 26 is not in a locking position. A thumb screw 28 is provided on the locking mechanism 26 to allow the locking mechanism 26 to be locked in place on the shaft 17. For example, tightening the thumb screw 26 will cause locking mechanism 26 to be locked to the shaft 17 due to friction of the thumb screw 28 urging against wall of the shaft 17.

The locking mechanism 26 may include a spring connector 30. The spring connector 30 may be a simple loop as shown in FIG. 1. A spring connector 30 allows a spring 32 to connect to the locking mechanism 26. The spring 32 is part of an attaching mechanism 34 which is used to attach the tool 10 to the rim 42 of the wheel 40 as shown in FIG. 2 and FIG. 3 and will be discussed further in detail below.

The attaching mechanism 34 includes hooks 36. Some embodiments of the invention a single hook 36 maybe provided. In other embodiments and as shown, two hooks 36 are provided. In another embodiments of the invention, other numbers of hooks 36 maybe provided.

As shown in FIG. 1, the attaching mechanism 34 includes a handle 38. The handle 38 is provided to allow an user to easily adjust the position of the attaching mechanism 34 and provides a convenient way to carry the locking mechanism 34 and tool 10. The handle 38 is an optional feature.

Figure 2:
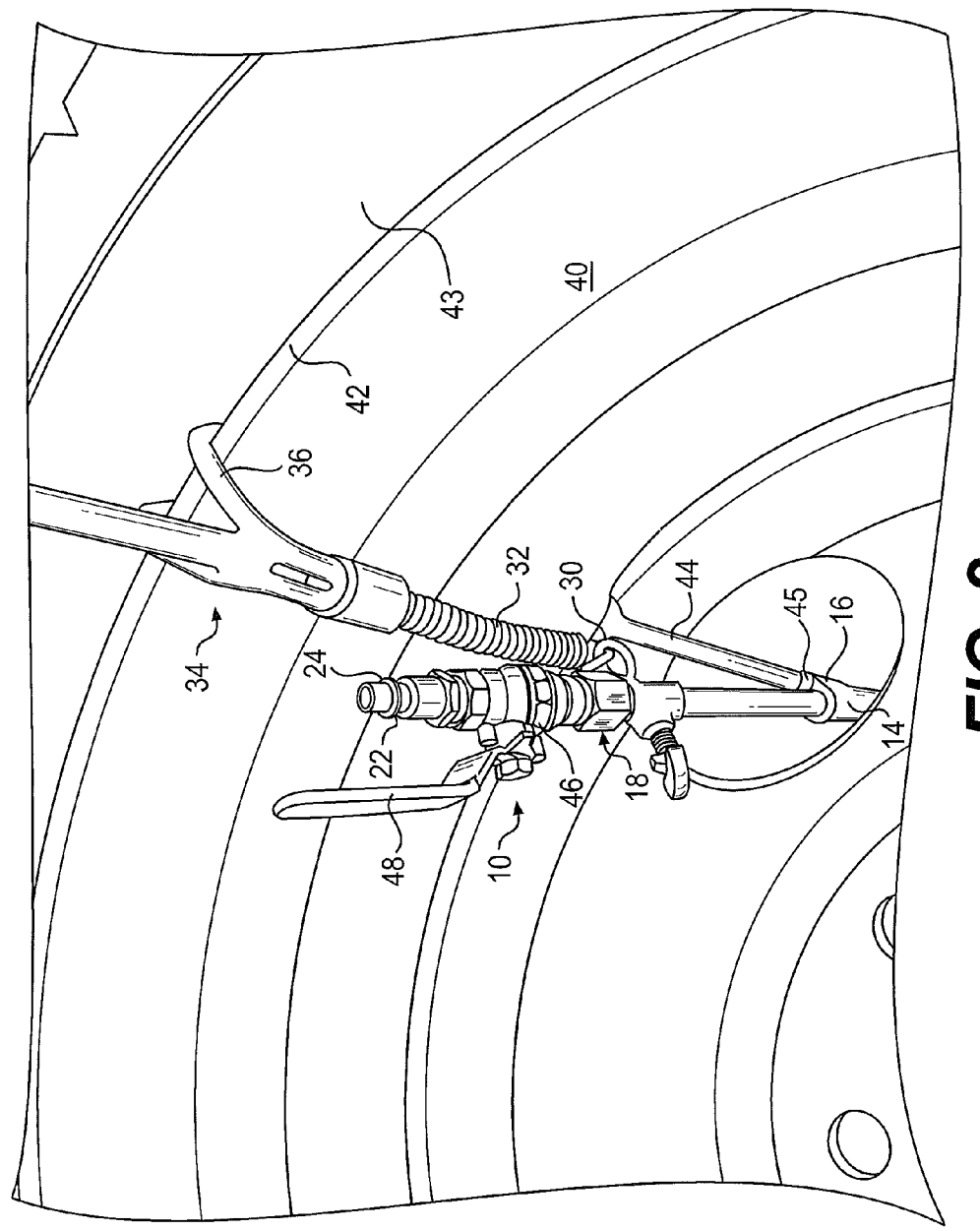
FIG. 2 is a perspective view of a hands free air chuck tool mounted to a wheel in accordance with another embodiment of the invention.
Figure 3:
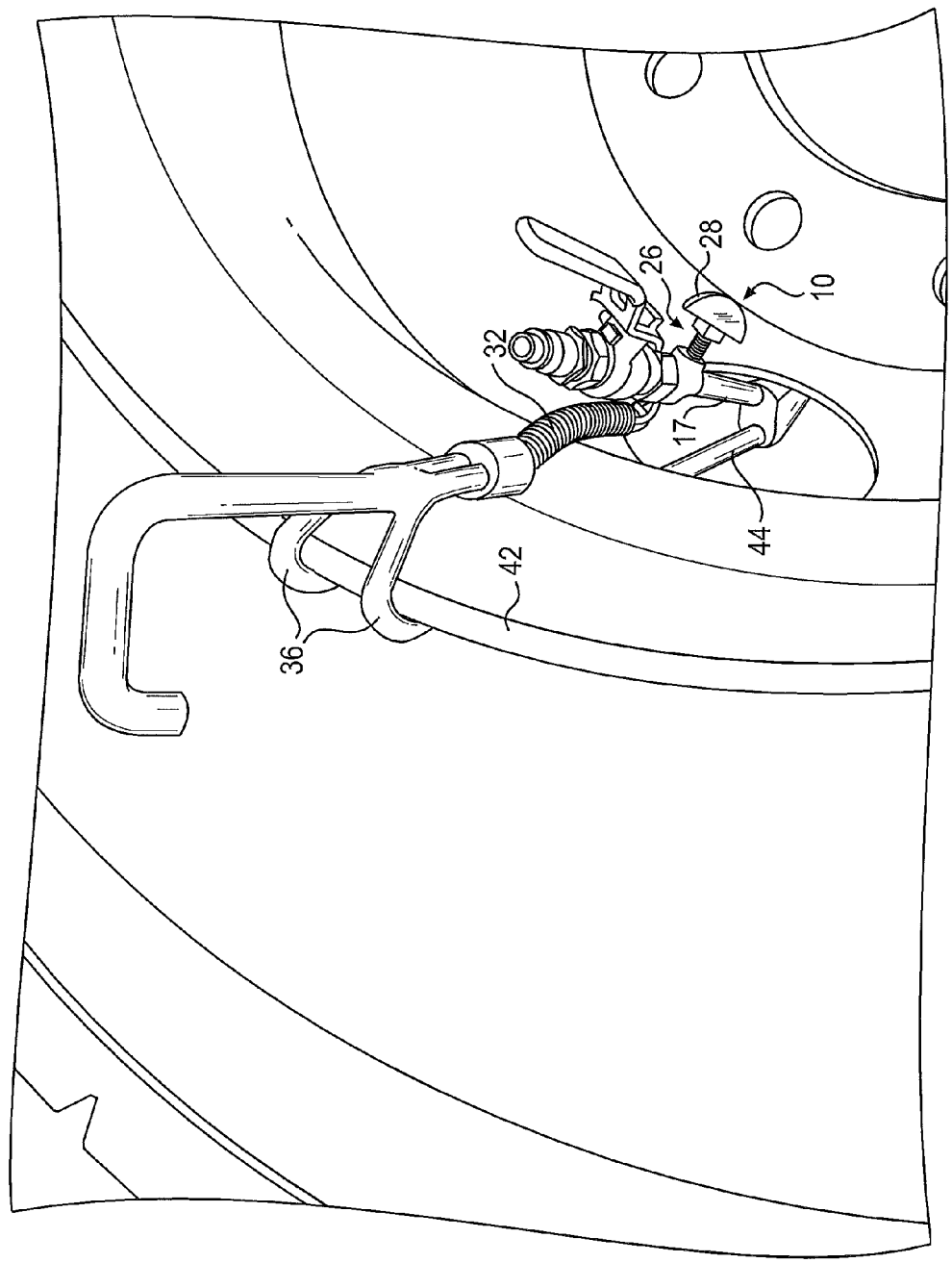
FIG. 3 is a perspective view of a hands free air chuck tool mounted to a wheel taken from a different angle than that shown in FIG. 2.

Turning now to FIG. 2 a tool 10 in accordance with another embodiment of the invention is slightly different than that shown in FIG. 1 is shown attached on a wheel 40. The wheel 40 includes a rim 42 and a tire 43. A valve stem 44 extends from the rim 42. The valve stem 44 allows selective fluid access to an inside or interior of the tire 43. Where inner tubes are used, the valve stem provides selective fluid access to inside the inner tube.

As shown in FIG. 2, the air chuck 16 of the end unit 14 is fit over the end 45 of the valve stem 44. This connection is in accordance with that well known in the art of fitting air chucks 16 fitting over valve stems 44. The attaching mechanism 34 has been engaged with the wheel 40 by the hooks 36 fitting over the rim 42. This engagement has caused the spring 36 to be stretched slightly and therefore providing a tensile force between the hooks 36 and the air fitting 16. The valve stem 44 is slightly compressed. The compressed fitting between the valve stem 44 and the air fitting 16 help hold that connection in place. The geometry of the hooks 36 in conjunction with the downward pressure exerted on the hooks 36 from the spring 32 also help keep the attaching mechanism 34 in place on the rim 42. With the tool 10 attached to the wheel 40 in this manner, the wheel 40 can be moved to various positions while allowing the tool 10 to be secure to the wheel 40. Furthermore, a user does not need to hold onto the tool 10 in order for the valve stem 44 and the air fitting 16 to be in fluid communication with each other.

In the embodiment shown in FIG. 2, the connector 18 is connected to a ball valve 46. The ball valve 46 includes a handle 48 that allows the ball valve 46 to be moved between an open and closed position. As shown in FIG. 2, the handle 48 is in a position which allows the ball valve 46 to be open. The ball valve 46 is connected to a hose fitting 22 having a nipple 24.

FIG. 3 shows an alternate view of the tool 10 shown in FIG. 2. The tool 10 is attached to the valve stem 44 and the hooks 36 are attached to the rim 42. The spring 32 has been slightly stretched. The locking mechanism 26 may move along the shaft 17 to provide a proper tension in the spring 32. For example, the various sizes of tires and rims can be accommodated by the locking mechanism 26 being slid to a different position and tightened with the thumb screw 28.

The addition of the ball valve 46 shown in the embodiment shown in FIG. 2 and FIG. 3 allows a user to selectively open and shut the ball valve 46 to selectively permit air pressure to exist within the tool 10. An explanation of how to use the tool 10 will now follow and will make reference to the ball valve 46. Embodiments where a ball valve 46 is not used or attached to the tool 10 a different type of valve maybe used or the air source itself maybe turned on or off as substitution of moving the ball valve 46 to an on or off position.

In some embodiments of the invention, the tool 10 is used as follows: the valve core (not shown but commonly known to exist within valve stems) within the valve stem 44 is removed. The valve core is a part of the valve stem 44 but often is spring loaded and may be pressed down to provide fluid communication to the interior of the tire 43. In other embodiments the valve core may physically be removed.

The air chuck or air fitting 16 is connected to the valve stem 44. The spring loaded attaching mechanism 34 is attached to the rim 42 via the hooks 36 fitting over the rim 42. The valve 46 is then turned to an off position. Then an air hose or pressurized hose that provide other fluids such as, for example, nitrogen to the tire 43 it is connected to the hose fitting 22. The air source or air compressor maybe turned on or a valve on the pressurized air source maybe opened.

In embodiments where the tire 43 is not already attached to rim 42 a procedure maybe used to attach or blow air into the tire 43 to seat the bead of the tire 43 to the rim 42 as well known on the art. For example, in some embodiments of the invention, a Bead Blaster or similar tool maybe used to set the bead and to provide an interior pressure of the tire 43 of about 5 psi. The ball valve 46 is turned to an off position and the air hose is removed from the hose fitting 24.

In some optional embodiments the tire 43 and wheel 40 is then placed in a tire cage. Then an air hose is reconnected to a hose fitting 22. In embodiments where the tire cage is remote from the air hose, an extension air hose maybe used to attach to the hose fitting 22. The ball valve 46 then maybe opened and fluid flows into the tire 43 until the tire achieves a desired pressure. Then the ball valve 46 maybe turned off. The air source may be turned off or a valve on the air pressure hose turned to an off position and the air hose removed from the hose fitting 22. The valve core may then be replaced in the valve stem 44. At this point, the tire 43 has a desired amount of pressure. The tire 43 maybe removed from the air cage and is ready for use on a vehicle.

In some embodiments the tool may also include: an additional tool assembly including a replacement spring of a different length than the spring such that the spring and hook can be removed and replaced with the additional tool assembly and replacement spring.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for filling a tire with a gas comprising:
   an air chuck;
   a shaft connected to the air chuck, wherein the shaft and air chuck are part of a dual foot;
   a rim hook connected to the shaft;
   a spring connecting the shaft and the rim hook; and
   a sliding locking mechanism that is located on a tubular section of the dual foot and lockable at a position along the tubular section, wherein the locking mechanism attaches to the spring.

2. The tool of claim 1, wherein the locking mechanism is locked by a thumb screw.

3. The tool of claim 1, wherein the rim hook is part of a hook assembly that includes a second hook.

4. The tool of claim 3, wherein the hook assembly includes a handle.

5. The tool of claim 4, further comprising a replacement spring of a different length than the spring such that the spring and rim hook can be removed and replaced with the replacement spring.

6. The tool of claim 1, further comprising:
   a hose fitting connected to the dual foot.

7. The tool of claim 1, further comprising:
   a valve connected to the dual foot and configured to selectively allow a gas communicating between an interior of the dual foot and a space external to the dual foot.

8. The tool of claim 7, wherein the valve is a ball valve.

9. The tool of claim 7, further comprising a hose fitting operatively connected to the valve wherein the valve selectively provides fluid communication between the hose fitting and the interior of the dual foot.

10. A tool for filling a tire with a gas comprising:
    means for dispensing air configured to connect to a valve stem;
    means for attaching connected to the means for dispensing air, wherein the means for attaching and the means for dispensing air are part of a dual foot;
    means for hooking connected to the means for attaching;
    means for tensioning connecting the means for hooking and the means for attaching; and
    a sliding locking mechanism that is located on a tubular section of the dual foot and lockable at a position along the tubular section, wherein the locking mechanism attaches to the means for tensioning.

* * * * *